(12) United States Patent
Pen et al.

(10) Patent No.: US 8,516,924 B2
(45) Date of Patent: Aug. 27, 2013

(54) REDUCING MECHANISM AND HARMONIC DRIVE THEREOF

(75) Inventors: Dar-Jen Pen, Taichung (TW);
Chun-Chien Ting, Yunlin County (TW);
Jan-Hao Chen, Changhua County (TW); En-Sheng Chang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 403 days.

(21) Appl. No.: 13/073,688

(22) Filed: Mar. 28, 2011

(65) Prior Publication Data

US 2012/0118092 A1 May 17, 2012

(30) Foreign Application Priority Data

Nov. 17, 2010 (TW) .............................. 99139611 A

(51) Int. Cl.
*F16H 33/00* (2006.01)
*F16H 35/00* (2006.01)
*F16H 37/00* (2006.01)

(52) U.S. Cl.
USPC ............................................................ 74/640

(58) Field of Classification Search
USPC ............................................................ 74/640
See application file for complete search history.

(56) References Cited

U.S. PATENT DOCUMENTS

| | | | | |
|---|---|---|---|---|
| 3,407,902 A | * | 10/1968 | Musser | 184/6.12 |
| 3,996,816 A | * | 12/1976 | Brighton | 74/640 |
| 4,425,822 A | * | 1/1984 | Marschner et al. | 74/640 |
| 4,479,403 A | * | 10/1984 | Marschner et al. | 74/640 |
| 5,984,048 A | | 11/1999 | Kiyosawa et al. | |
| 6,026,711 A | * | 2/2000 | Tortora et al. | 74/640 |
| 6,082,222 A | | 7/2000 | Kiyosawa et al. | |
| 6,269,711 B1 | * | 8/2001 | Tejima | 74/640 |
| 6,647,827 B2 | | 11/2003 | Kobayashi | |
| 6,968,755 B2 | * | 11/2005 | Kobayashi et al. | 74/640 |

(Continued)

FOREIGN PATENT DOCUMENTS

JP 02-296038 A 12/1990

OTHER PUBLICATIONS

Jeon et al., A study on stress and vibration analysis of a steel and hybrid flexspline for harmonic drive, Composite Structure, 2009, pp. 827-833, V47.

(Continued)

*Primary Examiner* — Troy Chambers
*Assistant Examiner* — Michael Gonzalez
(74) *Attorney, Agent, or Firm* — Morris Manning & Martin LLP; Tim Tingkang Xia, Esq.

(57) ABSTRACT

A harmonic drive includes a circular rigid internal gear, a circular flexible external gear, a wave generator, a cover, and a fan blade. The circular flexible external gear is disposed in the circular rigid internal gear, and the wave generator has at least one through hole and is disposed in the circular flexible external gear. The cover and the fan blade are respectively disposed at two opposite sides of the wave generator, and the cover is located in the circular flexible external gear. The cover and the wave generator form an air chamber together, and the through hole and an air flow opening are respectively in communication with the air chamber. The wave generator operates to drive the fan blade to operate. The fan blade rotates to generate an air flow, thus performing heat dissipation on the harmonic drive.

23 Claims, 10 Drawing Sheets

(56) References Cited

U.S. PATENT DOCUMENTS

| | | |
|---|---|---|
| 7,484,436 B2 | 2/2009 | Kiyosawa |
| 7,905,326 B2 * | 3/2011 | Kiyosawa et al. ............ 184/6.12 |
| 2002/0017160 A1 * | 2/2002 | Kiyosawa et al. .............. 74/640 |
| 2002/0026852 A1 * | 3/2002 | Kiyosawa et al. .............. 74/640 |
| 2002/0178861 A1 | 12/2002 | Kobayashi |

OTHER PUBLICATIONS

Kayabasi et al., Shape optimization of tooth profile of a flexspline for a harmonic drive by finite element modelling, Material and Design, 2007, pp. 441-447, V28.

* cited by examiner

REDUCING MECHANISM AND HARMONIC DRIVE THEREOF

CROSS-REFERENCE TO RELATED APPLICATIONS

This non-provisional application claims priority under 35 U.S.C. §119(a) on Patent Application No(s). 099139611 filed in Taiwan, R.O.C. on Nov. 17, 2010, the entire contents of which are hereby incorporated by reference.

FIELD OF THE INVENTION

The present disclosure relates to a reducing mechanism and a harmonic drive thereof, and more particularly to a reducing mechanism having heat dissipation and lubricating functions, and a harmonic drive thereof.

BACKGROUND OF THE INVENTION

Generally, in the process of designing a robot of a machine, the weight limit of a motor and the output requirement of a preset torque force are always taken into consideration. Therefore, a motor having smaller power, low torque force, and high rotational speed is usually selected to improve the output torque force together with a harmonic drive (or wave gear drive) having an adequate speed ratio, thereby achieving the output requirement. Compared with common gear transmission structures, the harmonic drive has advantages such as high motion accuracy, nearly zero back clearance, high transmission ratio, light weight, small volume, and large carrying capability. Therefore, the harmonic drive is broadly applied, in addition to being applied in joints of a multi-axis robot, the harmonic drive is also one of the key parts in a feed system of a tool machine and in a fine adjustment mechanism of precise instrument.

The harmonic drive mainly comprises a wave generator, a circular flexible external gear, and a circular rigid internal gear. The wave generator is formed by embedding a deep groove ball thin bearing in an elliptical cam. The circular flexible external gear is an elastic body of a thin cup shape, and external teeth are provided on a surface of a cup rim. The number of the teeth of the circular rigid internal gear is larger than that of the external teeth. During operation, the circular rigid internal gear is fixed, and the elliptical cam rotates due to the input of a high speed shaft. The deep groove ball thin bearing is fixed on the cam, and when the elliptical cam rotates, an external ring of the bearing is forced to be elastically deformed, so as to drive the circular flexible external gear to be elastically deformed to be partially engaged with the circular rigid internal gear. At this point, the circular flexible external gear starts to move with respect to the circular rigid internal gear, and since the numbers of teeth of the circular flexible external gear and the circular rigid internal gear are approximately the same, the circular flexible external gear can output a rather large torque force in a low rotational speed.

During the operation of the harmonic drive, the elastic deformation of the external ring of the bearing and the circular flexible external gear is used to achieve the effect of speed reducing. In the operation, the external ring of the bearing and the balls in the bearing under the driven of the elliptical cam generate rather high frictional heat energy. When the input shaft connected to the harmonic drive rotates in a speed of 3000 r/m, the temperature in the bearing of the wave generator is at least raised to above 75° C., such that the lubricating oil/grease in the bearing may be carbonized due to high temperature. When the lubricating oil/grease is carbonized due to the high temperature, the lubricating effect cannot be achieved, thus causing the damage or failure of the harmonic drive. Therefore, the above problem always limits the rotational speed of the input shaft, thus limiting the application condition of the harmonic drive.

Therefore, how to achieve the requirements on heat dissipation and lubrication of a harmonic drive is a target to be pursued by those researchers.

SUMMARY OF THE INVENTION

Accordingly, the present disclosure is a reducing mechanism and a harmonic drive thereof, so as to solve the problem in the prior art that a harmonic gear is damaged due to poor lubricating effect as the harmonic gear tends to be over heated when operating in a high speed.

The present disclosure provides a harmonic drive, which has at least one air flow opening. The harmonic drive comprises a circular rigid internal gear, a circular flexible external gear, a wave generator, a cover, and a fan blade. The circular flexible external gear is disposed in the circular rigid internal gear, the circular flexible external gear is a cup-shaped body, and the circular flexible external gear has a cup bottom end. The wave generator has at least one through hole, and the wave generator is disposed in the circular flexible external gear. The cover is disposed in the circular flexible external gear, and is disposed between the cup bottom end and the wave generator. The cover and the wave generator form an air chamber together, and the through hole and the air flow opening are respectively in communication with the air chamber. The fan blade and the cover are respectively disposed at two opposite sides of the wave generator. When an external force drives the wave generator and the fan blade to operate, the wave generator forces the circular flexible external gear to perform elastic deformation to be partially engaged with the circular rigid internal gear, such that the part of the circular rigid internal gear engaged with the circular flexible external gear moves along an annular path. Moreover, the through hole, the air chamber, and the air flow opening form an air flow channel, the fan blade rotates to generate an air flow, and the air flow flows through the air flow channel.

The present disclosure provides a reducing mechanism, which comprises an input shaft, an output shaft, and a harmonic drive. The output shaft has an air port. The harmonic drive comprises a circular rigid internal gear, a circular flexible external gear, a wave generator, a cover, and a fan blade. The circular flexible external gear is disposed in the circular rigid internal gear, and the circular flexible external gear is a cup-shaped body. The circular flexible external gear has a cup bottom end, and the cup bottom end is connected to the output shaft. The wave generator has at least one through hole, and the wave generator is disposed in the circular flexible external gear, and is connected to the input shaft. The cover is disposed in the circular flexible external gear, and is disposed between the cup bottom end and the wave generator. The cover and the wave generator form an air chamber together, and the through hole and air port are respectively in communication with the air chamber. The fan blade and the cover are respectively disposed at two opposite sides of the wave generator. When the input shaft drives the wave generator and the fan blade to operate, the wave generator forces the circular flexible external gear to perform elastic deformation to be partially engaged with the circular rigid internal gear, such that the part of the circular rigid internal gear engaged with the circular flexible external gear moves along an annular path. Moreover, the through hole, the air port, and the air chamber form an air flow channel, the fan blade rotates to generate an air flow, and the air flow flows through the air flow channel.

The present disclosure provides a reducing mechanism, which comprises an input shaft, an output shaft, and a harmonic drive. The input shaft has an air port. The harmonic drive comprises a circular rigid internal gear, a circular flexible external gear, a wave generator, a cover, and a fan blade. The circular flexible external gear is disposed in the circular rigid internal gear, and the circular flexible external gear is a cup-shaped body. The circular flexible external gear has a cup bottom end, and the cup bottom end is connected to the output shaft. The wave generator has at least one through hole, and the wave generator is disposed in the circular flexible external gear, and is connected to the input shaft. The cover is disposed in the circular flexible external gear, and is disposed between the cup bottom end and the wave generator. The cover and the wave generator form an air chamber together, and the through hole and air port are respectively in communication with the air chamber. The fan blade and the cover are respectively disposed at two opposite sides of the wave generator. When the input shaft drives the wave generator and the fan blade to operate, the wave generator forces the circular flexible external gear to perform elastic deformation to be partially engaged with the circular rigid internal gear, such that the part of the circular rigid internal gear engaged with the circular flexible external gear moves along an annular path. Moreover, the through hole, the air port, and the air chamber form an air flow channel, the fan blade rotates to generate an air flow, and the air flow flows through the air flow channel.

In the reducing mechanism and the harmonic drive thereof according to the present disclosure, the through holes are opened in the wave generator, together with the fan blade and the cover disposed at two opposite sides of the wave generator, the air flow channel is generated in the harmonic drive. Moreover, the operation of the fan blade generates the air flow, and the air flow enters in and flows out of the air flow channel to dissipate the heat generated by the operation of the harmonic drive, so the harmonic drive having the automatic heat dissipation effect may reduce the temperature therein during operation. Therefore, it is avoided that the lubricating oil is carbonized due to the high speed operation of the harmonic drive to influence the lubrication effect. The reducing mechanism and the harmonic drive thereof according to the present disclosure may take requirements on rotational speed and lifetime into consideration simultaneously.

These and other aspects of the present disclosure will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION OF THE DISCLOSURE

Figure 1A:
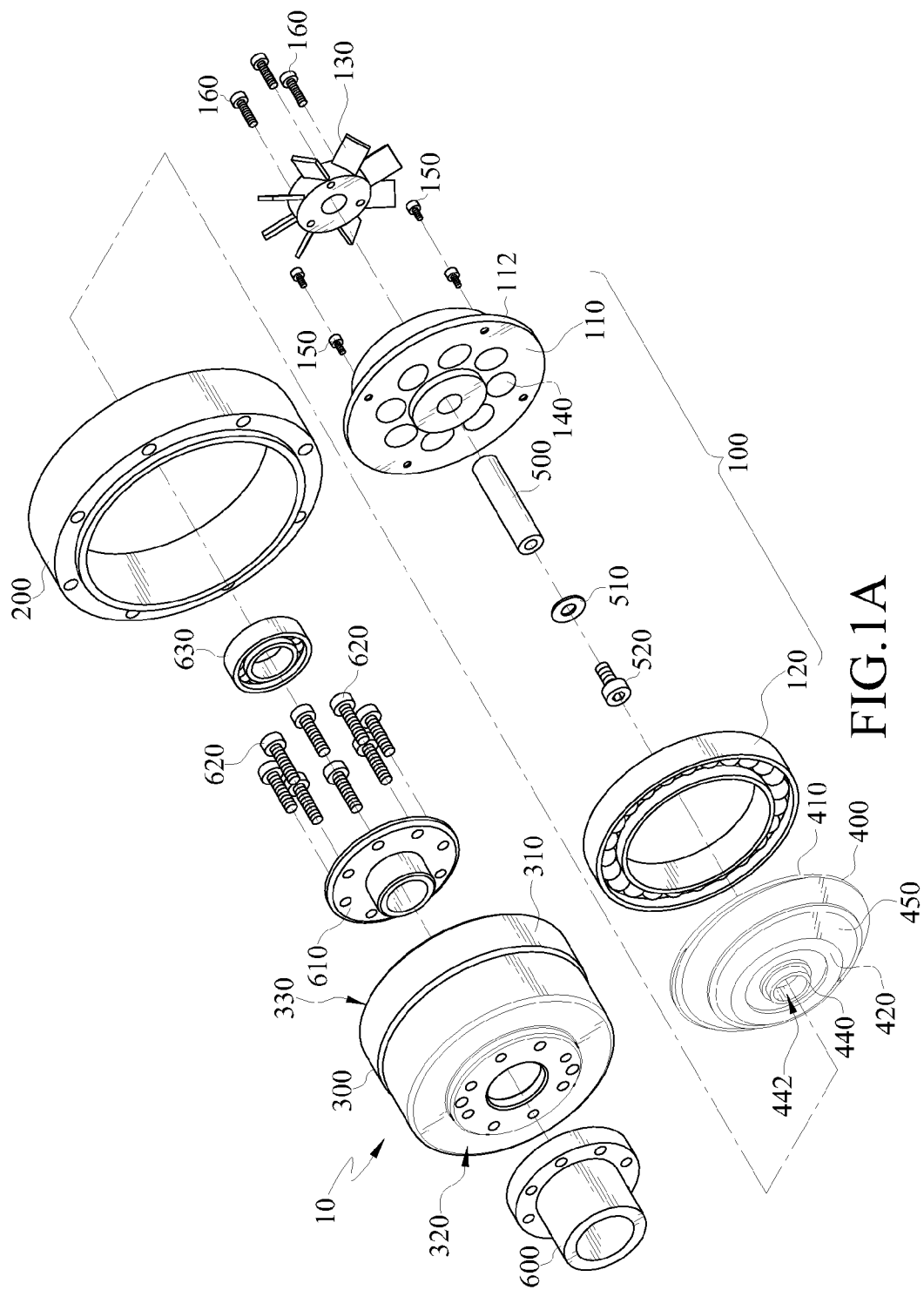
FIG. 1A is a schematic exploded structural view of a reducing mechanism according to an embodiment of the present disclosure.
Figure 1B:
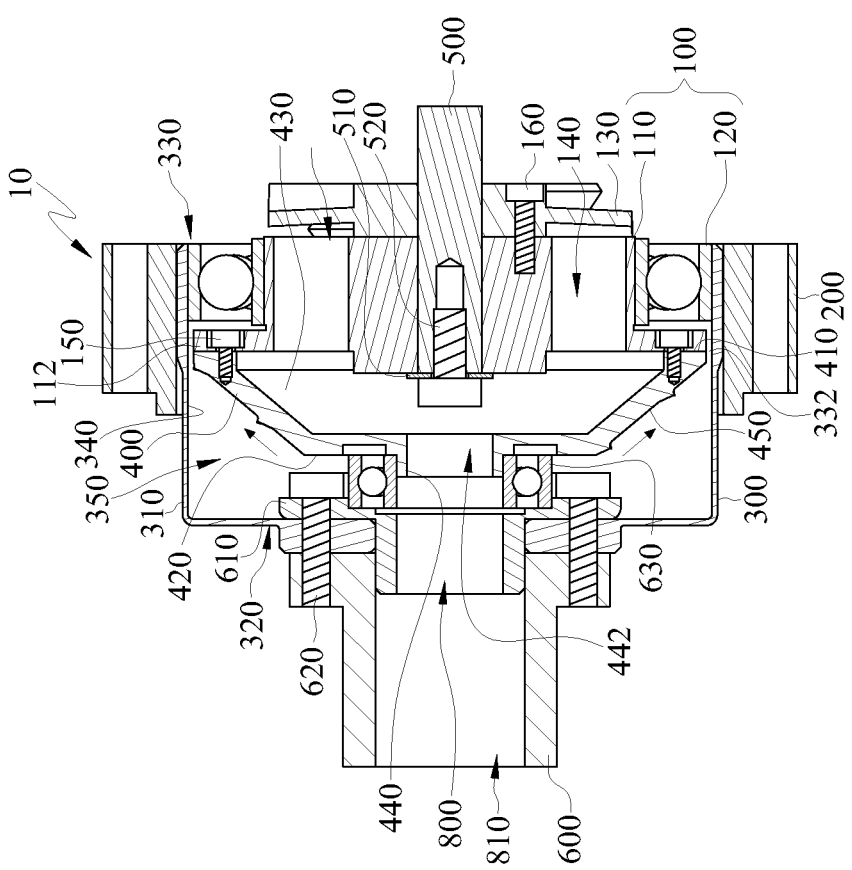
FIG. 1B is a sectional structural view of a reducing mechanism according to an embodiment of the present disclosure.

Referring to FIG. 1A and FIG. 1B, FIG. 1A is a schematic exploded structural view of a reducing mechanism according to an embodiment of the present disclosure, and FIG. 1B is a sectional structural view of the reducing mechanism according to an embodiment of the present disclosure.

The reducing mechanism according to an embodiment of the present disclosure comprises an input shaft 500, an output shaft 600, and a harmonic drive 10. The output shaft 600 has an air port 810. The harmonic drive 10 comprises a circular rigid internal gear 200, a circular flexible external gear 300, a wave generator 100, a cover 400, and a fan blade 130. The circular rigid internal gear 200 is, for example, an annular body having a plurality of internal teeth on an inner side thereof, and the circular rigid internal gear 200 has a shape fixed normally and keeping static.

The circular flexible external gear 300 is, for example, a cylindrical cup-shaped body, and an outer wall face of the cup-shaped body has a plurality of external teeth. The circular flexible external gear 300 is made of an elastic material, and the circular flexible external gear 300 can perform elastic deformation under an external force to change the external diameter shape of the cup-shaped body thereof. The circular flexible external gear 300 is disposed in the circular rigid internal gear 200, and the circular flexible external gear 300 is elastically deformed such that external teeth thereof is partially engaged with the internal teeth of the circular rigid internal gear 200. It should be noted that, the number of the external teeth of the circular flexible external gear 300 is generally less than the number of the internal teeth of the circular rigid internal gear 200 (for example, less by two teeth). In addition, the circular flexible external gear 300 has a body 310, and the body 310 is a cup-shaped body. The body 310 has a cup bottom end 320 and a cup rim end 330 opposite to each other, and the output shaft 600 is connected to the cup bottom end 320. The body 310 further has an inner wall face 340 therein.

The wave generator 100 is disposed in the body 310, and is adjacent to the cup rim end 330. The wave generator 100 comprises a bearing 120 and an elliptical cam 110, and the body 310 of the circular flexible external gear 300 sleeves the bearing 120 and the elliptical cam 110. More specifically, the inner wall face 340 of the body 310 attaches and surrounds the bearing 120. The elliptical cam 110 is disposed in the bearing 120, and the input shaft 500 is connected with the elliptical cam 110 through a gasket 510 and a screw 520. The elliptical cam 110 is not circular, and thus when the wave generator 100 is disposed in the body 310, the body 310 is forced to have a part adjacent to the cup rim end 330 elastically deformed from circular shape to elliptical shape.

Moreover, the elliptical cam 110 further has a plurality of through holes 140, and the through holes 140 penetrate the elliptical cam 110. It should be noted that, the number of the through holes 140 is not intended to limit the present disclosure, and at least one through hole 140 is available.

When the input shaft 500 rotates to drive the elliptical cam 110 of the wave generator 100 to rotate, the elliptical cam 110 forces the circular flexible external gear 300 to perform elastic deformation to be partially engaged with the circular rigid internal gear 200. Moreover, the major axis of the elliptical cam 110 changes its direction along with the rotation, the part of the circular rigid internal gear 200 engaged with the circular flexible external gear 300 is also changed continuously, and the engaged part moves along a circular path with the axes of the circular rigid internal gear 200 as a center of the circle. The number of the external teeth of the circular flexible external gear 300 is less than the number of the internal teeth of the circular rigid internal gear 200, so when the elliptical cam 110 rotates to change the engaged part of the circular rigid internal gear 200 and the circular flexible external gear 300 continuously, the circular flexible external gear 300 also rotates slowly with respect to the circular rigid internal gear 200. Therefore, a rather distinct ratio of revolutions exists between the input shaft 500 and the output shaft 600, thus achieving the effect of speed reducing.

Referring to FIG. 1A and FIG. 1B again, the cover 400 and the fan blade 130 of the present disclosure are respectively disposed at two opposite sides of the elliptical cam 110. The fan blade 130 is disposed on the elliptical cam 110 by securing with screws 160, and the fan blade 130 is located outside the cup rim end 330 and adjacent to the plurality of through holes 140. It should be noted that, the binding manner of the fan blade 130 and the elliptical cam 110 is not intended to limit the present disclosure. For example, the two may also be bound through welding. Alternatively, the fan blade 130 and the elliptical cam 110 may also be formed integrally. In other words, the fan blade 130 is directed shaped on the elliptical cam 110, and it is unnecessary for the two to be separated as two components.

Moreover, the cover 400 is disposed in the body 310 of the circular flexible external gear 300, and is located between the elliptical cam 110 and the cup bottom end 320. The cover 400 has a first side 410 and a second side 420 opposite to each other, and the first side 410 is formed with a recess structure. The cover 400 is disposed on the elliptical cam 110 with the first side 410 by securing with screws 150, and due to the recess structure, the cover 400 and the elliptical cam 110 form an air chamber 430 together. The air chamber 430 is in communication with the through holes 140 of the elliptical cam 110.

In addition, the circular flexible external gear 300 of this embodiment further comprises a clamping member 610, and the clamping member 610 is disposed at the cup bottom end 320 and faces the cover 400. The clamping member 610 has an air flow opening 800 and a bearing 630. The second side 420 of the cover 400 has a shaft 440, and the shaft 440 is disposed in the bearing 630. Furthermore, the shaft 440 has an axle hole 442 in communication with the air chamber 430, and the axle hole 442 is also in communication with the air flow opening 800. In addition, the output shaft 600 and the clamping member 610 clamp the cup bottom end 320 therebetween through screws 620. Moreover, the air port 810 of the output shaft 600 is in communication with the air flow opening 800 of the clamping member 610. Therefore, the through holes 140, the air chamber 430, the axle hole 442, the air flow opening 800, and the air port 810 sequentially form an air flow channel penetrating the harmonic drive 10.

Therefore, when the input shaft 500 rotates to drive the fan blade 130 and the elliptical cam 110 to rotate simultaneously, the fan blade 130 generates an air flow. The air flow flows in the air chamber 430 via the through holes 140, and flows out of the air chamber 430 via the air port 810. In the process of the air flow flowing in and out the air chamber 430, the heat energy generated by the operation of the harmonic drive 10 is dissipated, thus achieving the effect of heat dissipation. It should be noted that, the air flow in the embodiment enters in the air chamber 430 via the through holes 140, but it is not intended to limit the present disclosure. For example, if the rotational direction of the input shaft 500 is opposite to that in the above embodiment, the air flow enters in the air chamber 430 via the air port 810, and flows out of the air chamber 430 via the through holes 140.

It should be noted that, the clamping member 610 of the present disclosure is fixed to the cup bottom end 320 through screws, but the fixing manner thereof is not intended to limit the present disclosure. For example, the clamping member 610 may also be directly formed on the cup bottom end 320, that is, the clamping member 610 and the body 310 of the circular flexible external gear 300 are formed integrally.

In addition, in the present disclosure, an oil collecting space 350 is further formed between the cover 400 and the cup bottom end 320, and the oil collecting space 350 stores lubricating oil. The cover 400 isolates the lubricating oil in the oil collecting space 350 and air in the air chamber 430; that is to say, the air chamber 430 is not in communication with the oil collecting space 350. Therefore, it is ensured that the lubricating oil in the oil collecting space 350 will not be deteriorated due to the pollution of external air, thus avoiding the lubricating effect of the lubricating oil from failing. In this embodiment, the side of the elliptical cam 110 facing the cup bottom end 320 further has a flange 112, the flange 112 extends from the periphery of the elliptical cam 110, and a gap 332 is formed between the flange 112 and the inner wall face 340 of the body 310. The lubricating oil in the oil collecting space 350 can flow through the gap 332 to contact with the bearing 120, thus achieving the effect of lubricating the bearing 120.

Figure 1C:
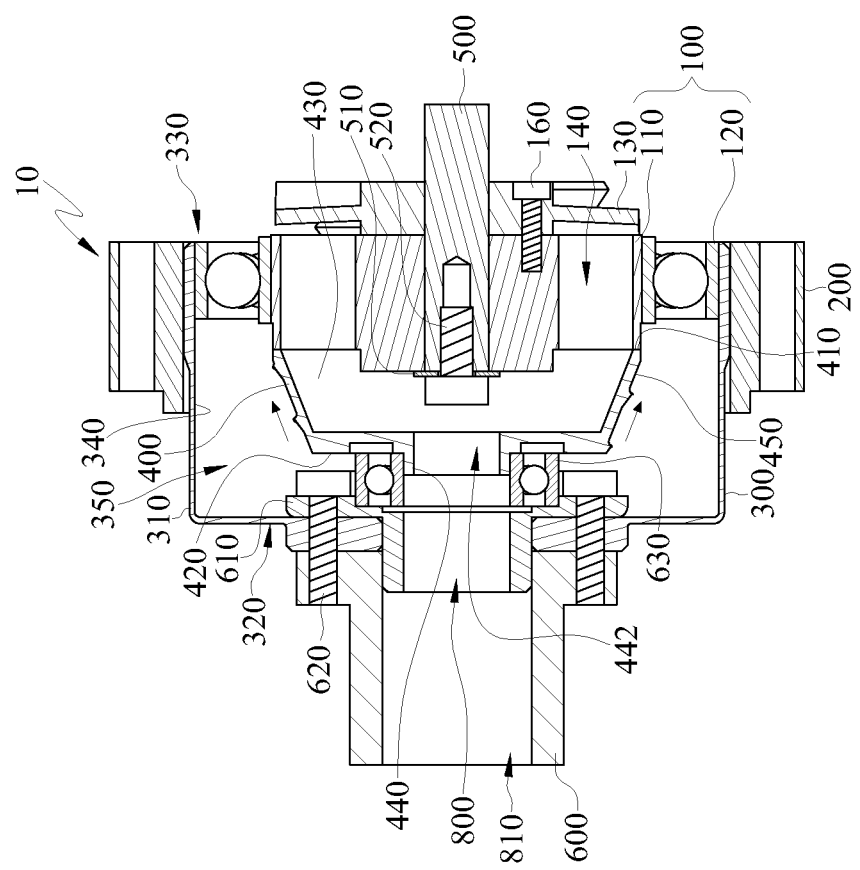
FIG. 1C is a sectional structural view of a reducing mechanism according to another embodiment of the present disclosure.

It should be noted that, in this embodiment, the elliptical cam 110 has a flange 112, such that the lubricating oil must flow through the gap 332 to contact with the bearing 120, but the present disclosure is not limited to the feature. For example, as shown in FIG. 1C, the elliptical cam 110 may not have the flange 112, and the lubricating oil in the oil collecting space 350 may directly contact with the bearing 120.

Figure 2:
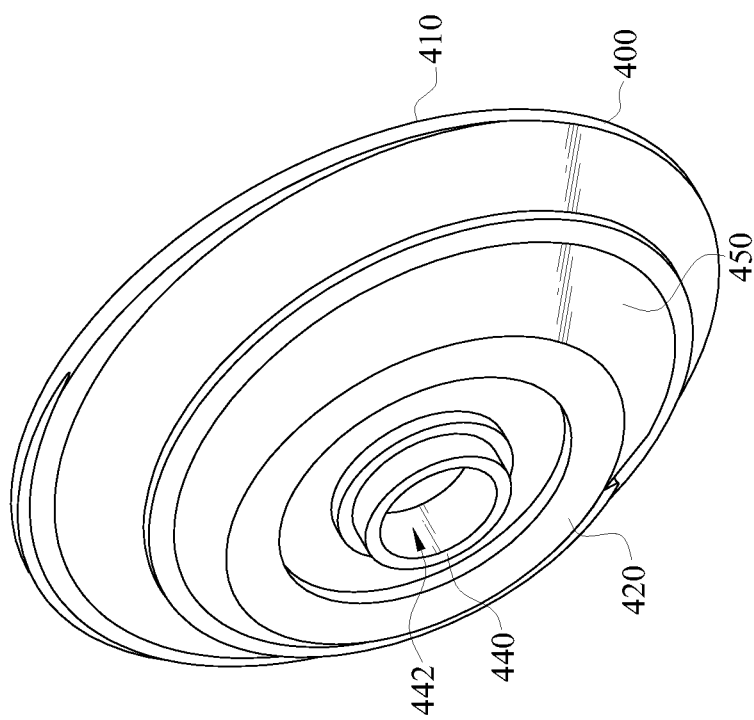
FIG. 2 is an enlarged schematic structural view of a cover according to an embodiment of the present disclosure.

Referring to FIG. 1B again together with FIG. 2, and FIG. 2 is an enlarged schematic structural view of a cover according to an embodiment of the present disclosure. The cover 400 of the present disclosure further has a spiral groove 450, and the spiral groove 450 is located at the second side 420 of the cover 400 and is located in the oil collecting space 350. When the input shaft 500 rotates to drive the cover 400 to rotate, the spiral groove 450 may guide the lubricating oil in the oil collecting space 350 to flow to the gap 332, such that the lubricating oil can be supplemented in the bearing 120 smoothly.

Figure 3A:
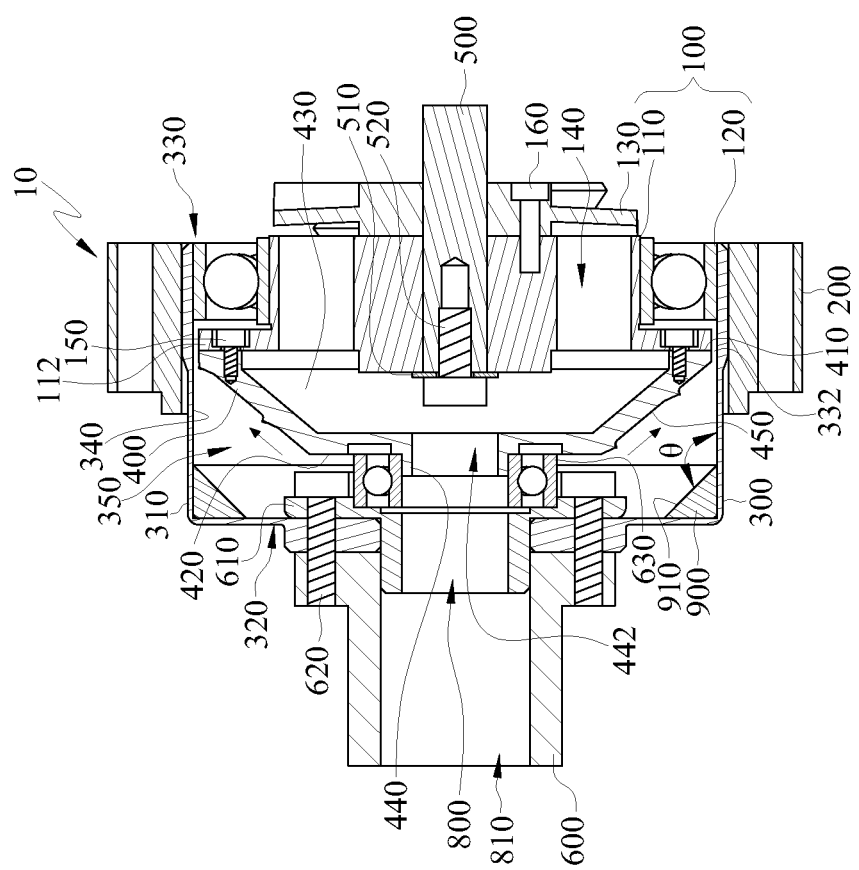
FIG. 3A is a sectional structural view of a reducing mechanism according to another embodiment of the present disclosure.
Figure 3B:
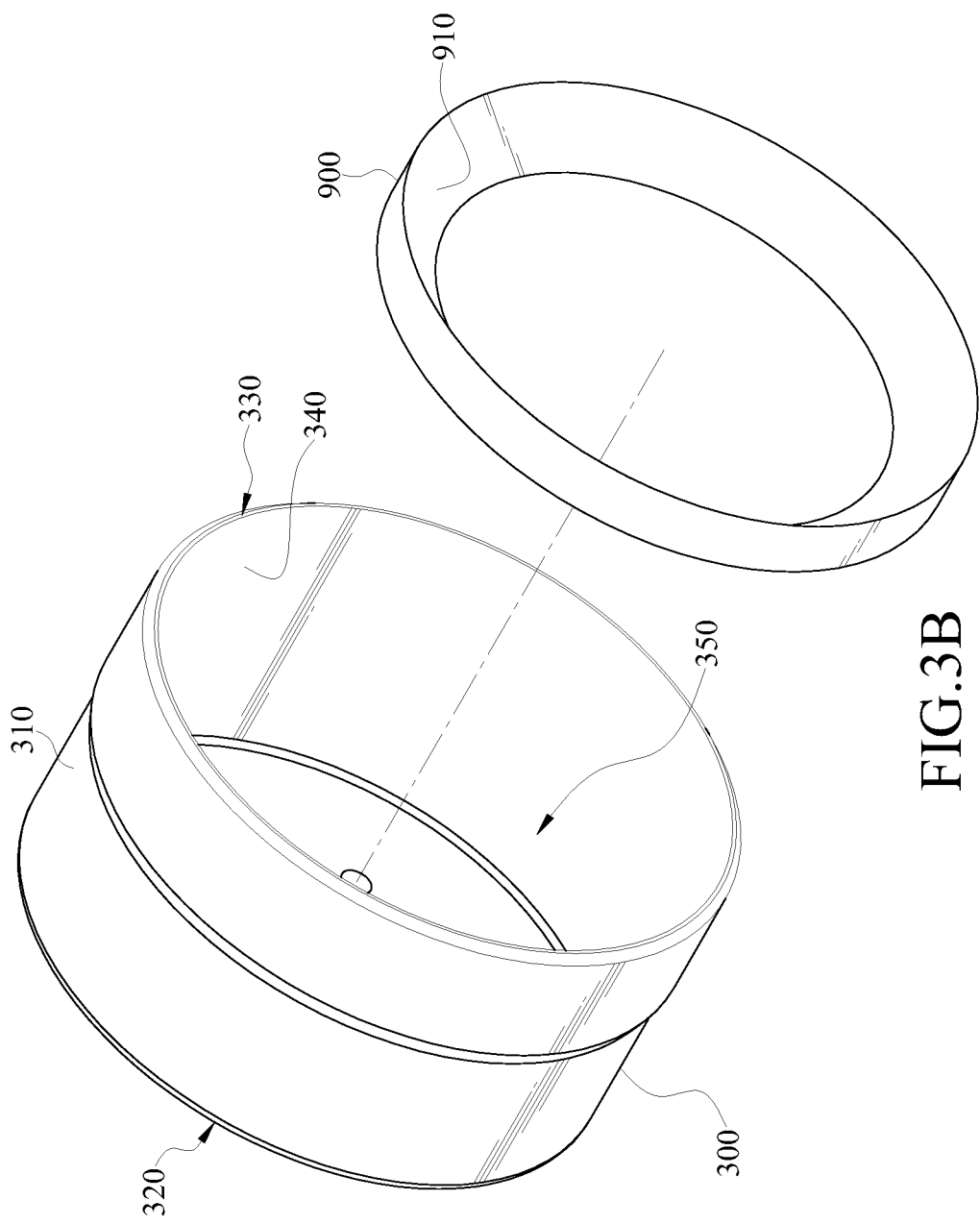
FIG. 3B is an enlarged schematic structural view of a guide ring and a circular flexible external gear according to another embodiment of the present disclosure.

Referring to FIG. 3A and FIG. 3B, FIG. 3A is a sectional structural view of a reducing mechanism according to another embodiment of the present disclosure, and FIG. 3B is an enlarged schematic structural view of a guide ring and a circular flexible external gear according to another embodiment of the present disclosure.

In this embodiment, the circular flexible external gear 300 further has a guide ring 900. The guide ring 900 is made of an elastic material (such as rubber), so as to avoid influencing the motion process of the elastic deformation of the circular flexible external gear 300. The guide ring 900 is located between the cup bottom end 320 and the cover 400, and the guide ring 900 is attached to the cup bottom end 320 and the inner wall face 340. The guide ring 900 further has a bevel face 910, the bevel face 910 is connected to the inner wall face 340, and an angle θ is included between the bevel face 910 and the inner wall face 340. Due to the design of the bevel face 910, the lubricating oil in the oil collecting space 350 may be guided to flow to the gap 332 under the gravity, such that the lubricating oil may be supplemented in the bearing 120 smoothly.

Figure 3C:
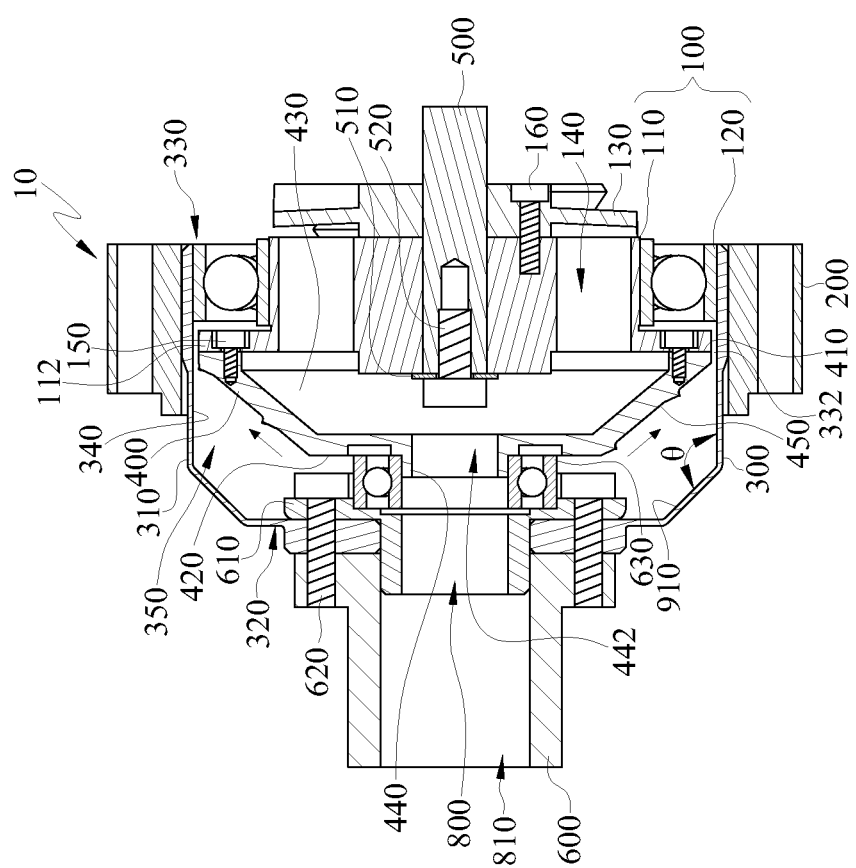
FIG. 3C is a sectional structural view of a reducing mechanism according to another embodiment of the present disclosure.

It should be noted that, in this embodiment, the bevel face 910 for guiding the lubricating oil is provided by the guide ring 900. However, in practical application, the guide ring 900 is dispensable for achieving this effect. For example, the bevel face 910 may also be directly disposed in the body 310 of the circular flexible external gear 300, and the bevel face 910 is integrally formed with the body 310, as shown in FIG. 3C.

In the above embodiments, the air port 810 is disposed on the output shaft 600, but the present disclosure is not limited to the feature. An embodiment in which the air port 810 is disposed on the input shaft 500 is illustrated below.

Figure 4:
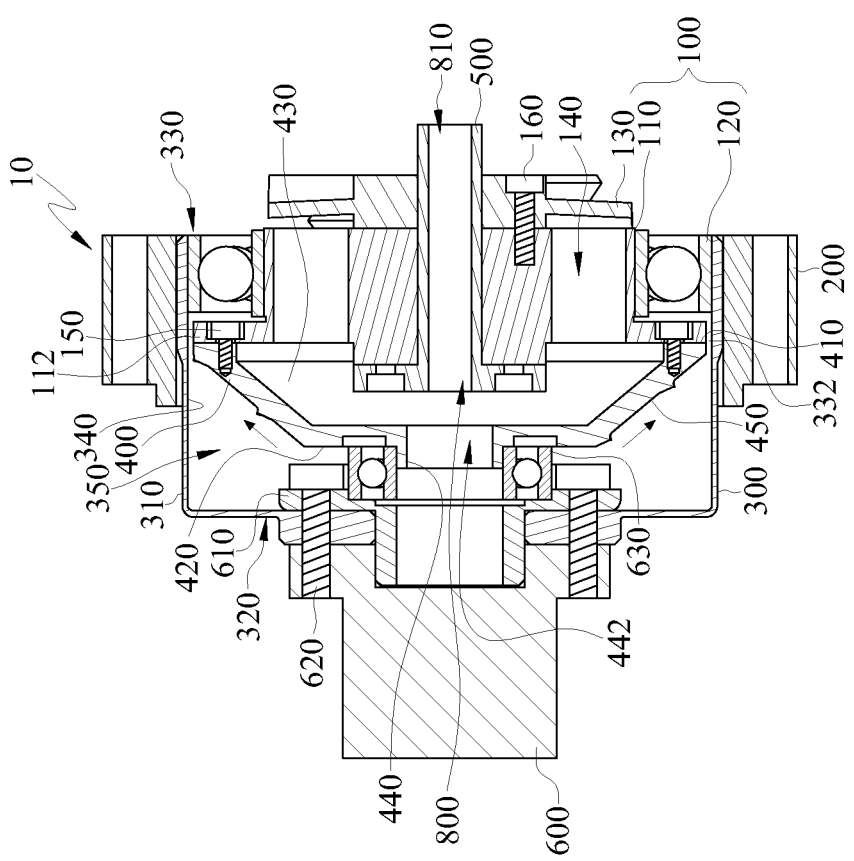
FIG. 4 is a sectional structural view of a reducing mechanism according to another embodiment of the present disclosure.

Referring to FIG. 4, and FIG. 4 is a sectional structural view of a reducing mechanism according to another embodiment of the present disclosure. This embodiment has a structure similar to that in the embodiment of FIG. 1B, and thus only differences therebetween are described below.

A reducing mechanism according to an embodiment of the present disclosure comprises an input shaft 500, an output shaft 600, and a harmonic drive 10. The input shaft 500 has an air port 810. The harmonic drive 10 comprises a circular rigid internal gear 200, a circular flexible external gear 300, a wave generator 100, a cover 400, and a fan blade 130.

The circular flexible external gear 300 is disposed in the circular rigid internal gear 200, and external teeth of the circular flexible external gear 300 are partially engaged with internal teeth of the circular rigid internal gear 200. In addition, the circular flexible external gear 300 has a body 310, and the body 310 is a cup-shaped body. The body 310 has a cup bottom end 320 and a cup rim end 330 opposite to each other, and the output shaft 600 is connected to the cup bottom end 320. The body 310 further has an inner wall face 340 therein.

The wave generator 100 is disposed in the body 310, and is adjacent to the cup rim end 330. The wave generator 100 comprises a bearing 120 and an elliptical cam 110, and the body 310 of the circular flexible external gear 300 sleeves the bearing 120 and the elliptical cam 110. The elliptical cam 110 is disposed in the bearing 120, and has an air flow opening 800. The input shaft 500 is connected to the elliptical cam 110, and the air port 810 of the input shaft 500 is in communication with the air flow opening 800 of the elliptical cam 110.

Moreover, the elliptical cam 110 further has a plurality of through holes 140, and the through holes 140 penetrate the elliptical cam 110.

In the present disclosure, the cover 400 and the fan blade 130 are respectively disposed at two opposite sides of the elliptical cam 110. The fan blade 130 is disposed on the elliptical cam 110 by securing through the screws 160, and the fan blade 130 is located outside the cup rim end 330 and is adjacent to the plurality of through holes 140. It should be noted that, the binding manner of the fan blade 130 and the elliptical cam 110 is not intended to limit the present disclosure. For example, the two may also be bound through welding, or formed integrally.

Moreover, the cover 400 is disposed in the body 310 of the circular flexible external gear 300, and is located between the elliptical cam 110 and the cup bottom end 320. The cover 400 has a first side 410 and a second side 420 opposite to each other, and the first side 410 is formed with a recess structure. The cover 400 is disposed on the elliptical cam 110 with the first side 410, and due to the recess structure, the cover 400 and the elliptical cam 110 form an air chamber 430 together. The through holes 140 and the air flow opening 800 are both in communication with the air chamber 430.

In addition, the circular flexible external gear 300 of this embodiment further comprises a clamping member 610, and the clamping member 610 is disposed at the cup bottom end 320 and faces the cover 400. The clamping member 610 has a bearing 630. The second side 420 of the cover 400 has a shaft 440, and the shaft 440 is disposed in the bearing 630. Moreover, the output shaft 600 and the clamping member 610 clamp the cup bottom end 320 therebetween through the screws 620.

As can be seen from the above structure, the through holes 140, the air chamber 430, the axle hole 442, the air flow opening 800, and the air port 810 sequentially form an air flow channel penetrating the harmonic drive 10.

Therefore, when the input shaft 500 rotates to drive the fan blade 130 and the elliptical cam 110 to rotate simultaneously, the fan blade 130 generates an air flow. The air flow flows in the air chamber 430 via the through holes 140, and flows out of the air chamber 430 via the air port 810. In the process of the air flow flowing in and out the air chamber 430, the heat energy generated by the operation of the harmonic drive 10 is dissipated, thus achieving the effect of heat dissipation. It should be noted that, the air flow in the embodiment enters in the air chamber 430 via the through holes 140, but it is not intended to limit the present disclosure. For example, if the rotational direction of the input shaft 500 is opposite to that in the above embodiment, the air flow enters in the air chamber 430 via the air port 810, and flows out of the air chamber 430 via the through holes 140.

Further, in the present disclosure, an oil collecting space 350 is formed between the cover 400 and the cup bottom end 320, and the oil collecting space 350 stores lubricating oil. The cover 400 isolates the lubricating oil in the oil collecting space 350 and air in the air chamber 430, that is, the air chamber 430 is not in communication with the oil collecting space 350. In this embodiment, the side of the elliptical cam 110 facing the cup bottom end 320 further has a flange 112, the flange 112 surrounds the periphery of the elliptical cam 110, and a gap 332 is formed between the flange 112 and the inner wall face 340 of the body 310. The lubricating oil in the oil collecting space 350 may flow through the gap 332 to contact with the bearing 120, thus achieving the effect of lubricating the bearing 120.

Further, the cover 400 of the present disclosure further has a spiral groove 450, and the spiral groove 450 is located at the second side 420 of the cover 400 and is located in the oil collecting space 350. When the input shaft 500 rotates to drive the cover 400 to rotate together, the spiral groove 450 may guide the lubricating oil in the oil collecting space 350 to flow to the gap 332, such that the lubricating oil can be supplemented in the bearing 120 smoothly.

Figure 5A:
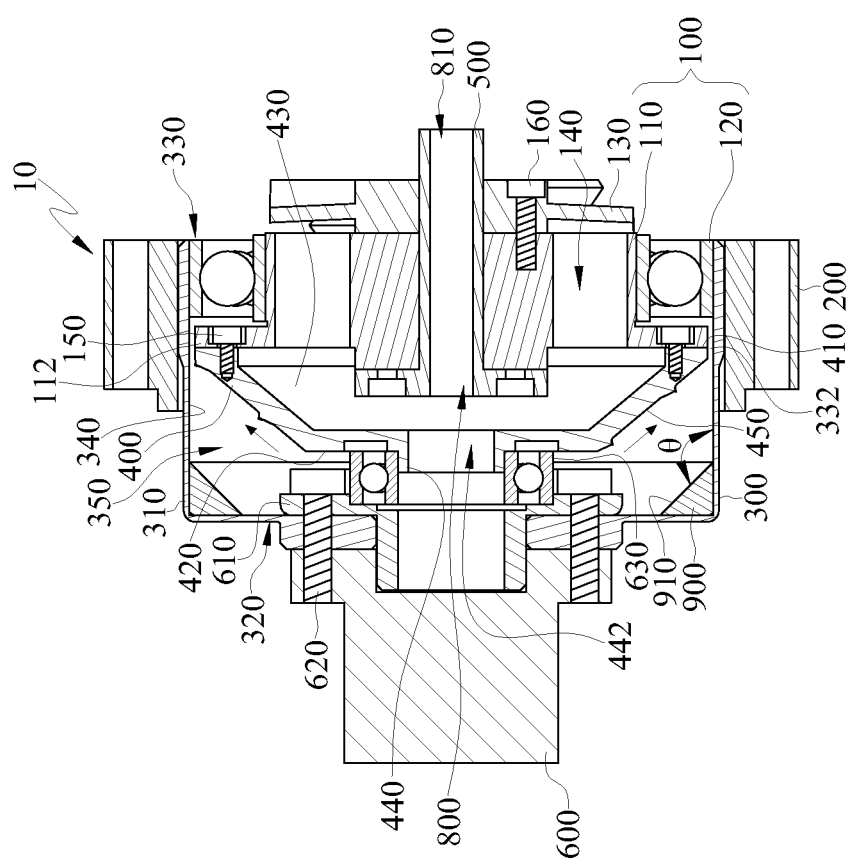
FIG. 5A is a sectional structural view of a reducing mechanism according to another embodiment of the present disclosure.
Figure 5B:
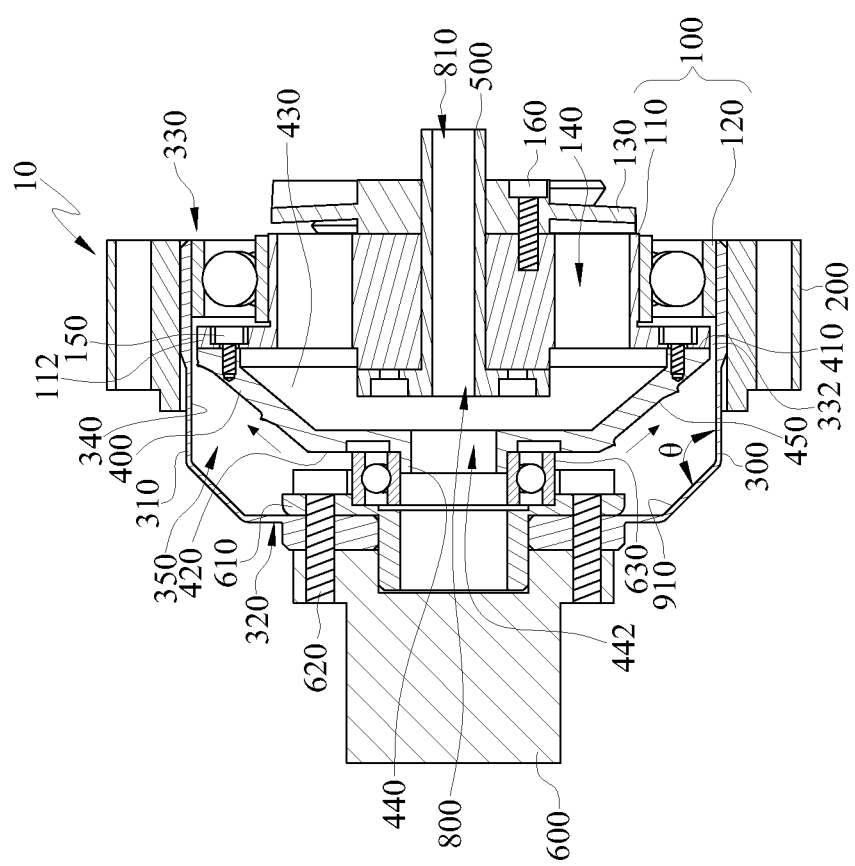
FIG. 5B is a sectional structural view of a reducing mechanism according to another embodiment of the present disclosure.

Referring to FIG. 5A and FIG. 5B, FIG. 5A is a sectional structural view of a reducing mechanism according to another embodiment of the present disclosure, and FIG. 5B is an enlarged schematic structural view of a guide ring and a circular flexible external gear according to another embodiment of the present disclosure. This embodiment has a structure similar to that in the embodiment of FIG. 4, and thus only differences therebetween are described below.

In this embodiment, the circular flexible external gear 300 further has a guide ring 900. The guide ring 900 is made of an elastic material, so as to avoid influencing the moving process of the elastic deformation of the circular flexible external gear 300. The guide ring 900 is located between the cup bottom end 320 and the cover 400, and the guide ring 900 is attached to the cup bottom end 320 and the inner wall face 340. The guide ring 900 further has a bevel face 910, the bevel face 910 is connected to the inner wall face 340, and an angle θ is included between the bevel face 910 and the inner wall face 340. Due to the design of the bevel face 910, the lubricating oil in the oil collecting space 350 may be guided to flow to the gap 332 under the gravity, such that the lubricating oil may be supplemented in the bearing 120 smoothly.

It should be noted that, in this embodiment, the bevel face 910 for guiding the lubricating oil is provided by the guide ring 900. However, in practical application, the guide ring 900 is dispensable for achieving this effect. For example, the bevel face 910 may also be directly disposed in the body 310 of the circular flexible external gear 300, and the bevel face 910 is integrally formed with the body 310, as shown in FIG. 5B.

According to the reducing mechanism and the harmonic drive thereof, through holes are opened on the wave generator, together with the fan blade and the cover disposed at two opposite sides of the wave generator, the air flow channel is generated in the harmonic drive. Moreover, the operation of the fan blade generates the air flow, and the air flow enters in and flows out of the air flow channel to dissipate the heat generated by the operation of the harmonic drive, so the harmonic drive having the automatic heat dissipation effect may reduce the temperature therein during operation. Therefore, it is avoided that the lubricating oil is carbonized due to the high speed operation of the harmonic drive to influence the lubrication effect. The reducing mechanism and the harmonic drive thereof according to the present disclosure may take requirements on rotational speed and lifetime into consideration simultaneously.

Moreover, in this embodiment, the spiral groove disposed on the cover and the bevel face on the guide ring may both guide the lubricating oil entering from the gap to flow in the bearing more smoothly, thus achieving the lubricating effect. Therefore, the reducing mechanism and the harmonic drive thereof according to the present disclosure may have smoother operation, thereby improving the lifetime thereof.

What is claimed is:

1. A harmonic drive, having at least one air flow opening, the harmonic drive comprising:
   a circular rigid internal gear;
   a circular flexible external gear, disposed in the circular rigid internal gear, wherein the circular flexible external gear is a cup-shaped body, and the circular flexible external gear has a cup bottom end;
   a wave generator, having at least one through hole, and disposed in the circular flexible external gear;
   a cover, disposed in the circular flexible external gear, and disposed between the cup bottom end and the wave generator, wherein the cover and the wave generator form an air chamber together, and the through hole and the air flow opening are respectively in communication with the air chamber; and
   a fan blade, wherein the fan blade and the cover are respectively disposed at two opposite sides of the wave generator;
   wherein, when an external force drives the wave generator and the fan blade to operate, the wave generator forces the circular flexible external gear to perform elastic deformation to be partially engaged with the circular rigid internal gear, such that a part of the circular rigid internal gear engaged with the circular flexible external gear moves along an annular path, the through hole, the air chamber, and the air flow opening form an air flow channel, the fan blade rotates to generate an air flow, and the air flow flows through the air flow channel.

2. The harmonic drive according to claim 1, wherein the air flow opening is located on the wave generator.

3. The harmonic drive according to claim 1, wherein the air flow opening is located on the circular flexible external gear.

4. The harmonic drive according to claim 3, wherein the circular flexible external gear further comprises a clamping member, the air flow opening is located on the clamping member, the clamping member is disposed at the cup bottom end and faces the cover, the clamping member has a bearing, the cover has a shaft, the shaft is disposed in the bearing, the shaft has an axle hole in communication with the air chamber, and the axle hole is in communication with the air flow opening.

5. The harmonic drive according to claim 1, wherein the circular flexible external gear further has a bevel face located between the cup bottom end and the cover, the bevel face faces the cover, and an angle is included between the bevel face and an inner wall face of the circular flexible external gear.

6. The harmonic drive according to claim 5, wherein the circular flexible external gear further has a guide ring, the guide ring is located between the cup bottom end and the cover, and the guide ring has the bevel face.

7. The harmonic drive according to claim 1, wherein the wave generator comprises:
   a bearing, sleeved in the circular flexible external gear; and
   an elliptical cam, disposed in the bearing, wherein the through holes penetrate the elliptical cam.

8. The harmonic drive according to claim 7, wherein an oil collecting space is formed between the cover and the cup bottom end, the oil collecting space stores lubricating oil, the cover isolates the lubricating oil in the oil collecting space and air in the air chamber, and the lubricating oil contacts with the bearing.

9. The harmonic drive according to claim 8, wherein the cover further has a spiral groove, and the spiral groove is located in the oil collecting space.

10. A reducing mechanism, comprising:
    an input shaft;
    an output shaft, having an air port; and
    a harmonic drive, comprising:
       a circular rigid internal gear;
       a circular flexible external gear, disposed in the circular rigid internal gear, wherein the circular flexible external gear is a cup-shaped body, and the circular flexible external gear has a cup bottom end connected to the output shaft;
a wave generator, having at least one through hole, disposed in the circular flexible external gear, and connected to the input shaft;
a cover, disposed in the circular flexible external gear, and disposed between the cup bottom end and the wave generator, wherein the cover and the wave generator form an air chamber together, and the through hole and the air port are respectively in communication with the air chamber; and
a fan blade, wherein the fan blade and the cover are respectively disposed at two opposite sides of the wave generator;
wherein, when the input shaft drives the wave generator and the fan blade to operate, the wave generator forces the circular flexible external gear to perform elastic deformation to be partially engaged with the circular rigid internal gear, such that a part of the circular rigid internal gear engaged with the circular flexible external gear moves along an annular path, the through hole, the air port, and the air chamber form an air flow channel, the fan blade rotates to generate an air flow, and the air flow flows through the air flow channel.

11. The reducing mechanism according to claim 10, wherein the circular flexible external gear further comprises a clamping member, the clamping member is disposed at the cup bottom end and faces the cover, the clamping member and the output shaft clamp the circular flexible external gear, the clamping member has a bearing, the cover has a shaft, the shaft is disposed in the bearing, the shaft has an axle hole in communication with the air chamber, and the axle hole is in communication with the air port.

12. The reducing mechanism according to claim 10, wherein the circular flexible external gear further has a bevel face located between the cup bottom end and the cover, the bevel face faces the cover, and an angle is included between the bevel face and an inner wall face of the circular flexible external gear.

13. The reducing mechanism according to claim 12, wherein the circular flexible external gear further has a guide ring, the guide ring is located between the cup bottom end and the cover, and the guide ring has the bevel face.

14. The reducing mechanism according to claim 10, wherein the wave generator comprises:
a bearing, sleeved in the circular flexible external gear; and
an elliptical cam, disposed in the bearing, and connected to the input shaft, wherein the through holes penetrate the elliptical cam.

15. The reducing mechanism according to claim 14, wherein an oil collecting space is formed between the cover and the cup bottom end, the oil collecting space stores lubricating oil, the cover isolates the lubricating oil in the oil collecting space and air in the air chamber, and the lubricating oil contacts with the bearing.

16. The reducing mechanism according to claim 15, wherein the cover further has a spiral groove, and the spiral groove is located in the oil collecting space.

17. A reducing mechanism, comprising:
an input shaft, having an air port;
an output shaft; and
a harmonic drive, comprising:
a circular rigid internal gear;
a circular flexible external gear, disposed in the circular rigid internal gear, wherein the circular flexible external gear is a cup-shaped body, and the circular flexible external gear has a cup bottom end connected to the output shaft;
a wave generator, having at least one through hole, disposed in the circular flexible external gear, and connected to the input shaft;
a cover, disposed in the circular flexible external gear, and disposed between the cup bottom end and the wave generator, wherein the cover and the wave generator form an air chamber together, and the through hole and the air port are respectively in communication with the air chamber; and
a fan blade, wherein the fan blade and the cover are respectively disposed at two opposite sides of the wave generator;
wherein, when the input shaft drives the wave generator and the fan blade to operate, the wave generator forces the circular flexible external gear to perform elastic deformation to be partially engaged with the circular rigid internal gear, such that a part of the circular rigid internal gear engaged with the circular flexible external gear moves along an annular path, the through hole, the air port, and the air chamber form an air flow channel, the fan blade rotates to generate an air flow, and the air flow flows through the air flow channel.

18. The reducing mechanism according to claim 17, wherein the circular flexible external gear further comprises a clamping member, the clamping member is disposed at the cup bottom end and faces the cover, the clamping member and the output shaft clamp the circular flexible external gear, the clamping member has a bearing, the cover has a shaft, and the shaft is disposed in the bearing.

19. The reducing mechanism according to claim 17, wherein the circular flexible external gear further has a bevel face located between the cup bottom end and the cover, the bevel face faces the cover, and an angle is included between the bevel face and an inner wall face of the circular flexible external gear.

20. The reducing mechanism according to claim 19, wherein the circular flexible external gear further has a guide ring, the guide ring is located between the cup bottom end and the cover, and the guide ring has the bevel face.

21. The reducing mechanism according to claim 17, wherein the wave generator comprises:
a bearing, sleeved in the circular flexible external gear; and
an elliptical cam, disposed in the bearing, and connected to the input shaft, wherein the through holes penetrate the elliptical cam.

22. The reducing mechanism according to claim 21, wherein an oil collecting space is formed between the cover and the cup bottom end, the oil collecting space stores lubricating oil, the cover isolates the lubricating oil in the oil collecting space and air in the air chamber, and the lubricating oil contacts with the bearing.

23. The reducing mechanism according to claim 22, wherein the cover further has a spiral groove, and the spiral groove is located in the oil collecting space.

* * * * *